United States Patent [19]
Capriotti

[11] 3,786,412
[45] Jan. 15, 1974

[54] PARKING INDICATORS FOR AUTOMOBILES

[76] Inventor: John J. Capriotti, 632 Snug Harbor Dr., Boynton Beach, Fla. 33435

[22] Filed: Jan. 10, 1972

[21] Appl. No.: 216,407

[52] U.S. Cl............. 340/54, 340/75, 340/79, 340/81 R, 340/107
[51] Int. Cl............................................. B60q 1/48
[58] Field of Search............ 340/52 R, 74, 75, 340/79, 80, 81 R, 84, 107

[56] References Cited
UNITED STATES PATENTS

| | | | |
|---|---|---|---|
| 1,137,070 | 4/1915 | Miller | 340/84 |
| 1,636,024 | 7/1927 | Vose | 340/112 |
| 2,060,831 | 11/1936 | Smith | 340/75 UX |
| 2,503,336 | 4/1950 | Hines | 340/107 X |
| 2,562,567 | 7/1951 | Moledzky | 340/52 H X |
| 2,864,074 | 12/1958 | McGowan | 340/74 |
| 2,866,175 | 12/1958 | Slater | 340/74 |
| 3,434,106 | 3/1969 | Lawless | 340/81 R X |
| 3,656,104 | 4/1972 | Samra | 340/95 |

FOREIGN PATENTS OR APPLICATIONS

| | | | |
|---|---|---|---|
| 667,967 | 8/1963 | Canada | 340/81 R |
| 622,203 | 6/1961 | Canada | 340/107 |

Primary Examiner—Kenneth N. Leimer
Attorney—Donal E. McCarthy et al.

[57] ABSTRACT

A safety parking signalling device for automobiles to enable the driver to advise drivers of vehicles to his rear of his intention to park. The device comprises a light compartment mounted at the rear of the vehicle and covered at its rear by a translucent sheet bearing "parking" indicia. The circuit to the lamps is controlled by a manual "on-off" switch mounted conveniently to the driver. A "flasher" unit and also preferably visible and/or audible indicating means, such as a lamp and/or buzzer respectively, are connected in series in the circuit to the lamps. Actuation of said switch to "on" position also energizes a separate second circuit having means therein to hold said lamp switch in on position until a switch in said second holding circuit is opened by performance of some operation, such as turning of the ignition, normally effected on completion of a parking maneuver.

4 Claims, 3 Drawing Figures

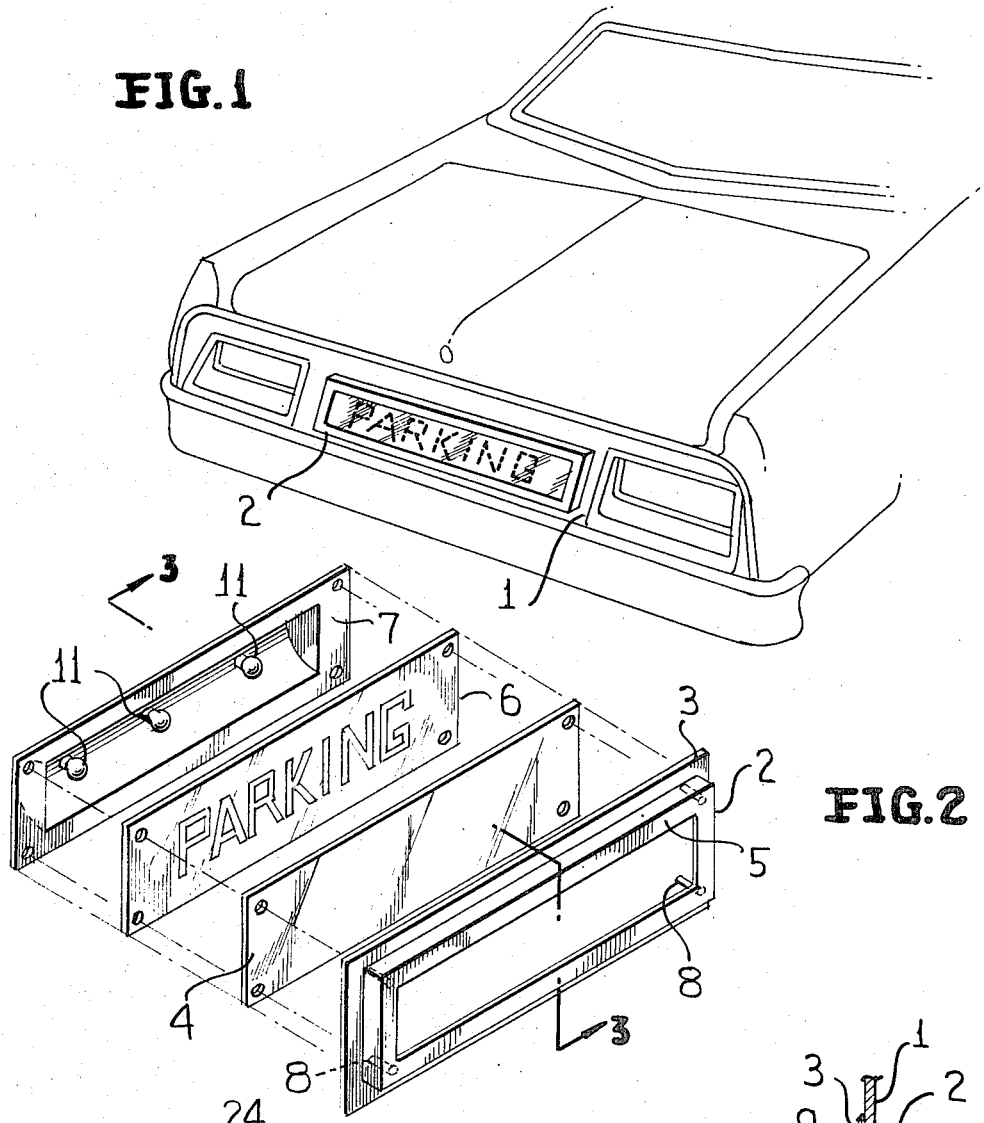
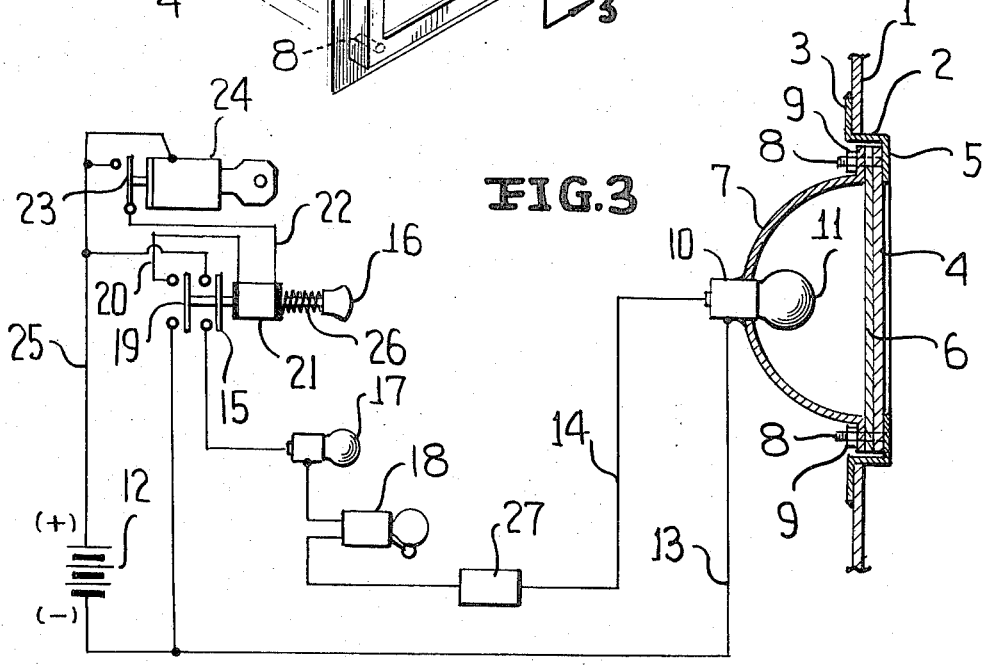

PARKING INDICATORS FOR AUTOMOBILES

The present invention relates to a safety signaling device for automobiles and, in particular, to an illuminated signal whereby the driver of an automobile may signal to drivers to his rear of his intention to park.

While numerous visual and audible signals are provided on automobiles, such as horns, stoplights, back-up lights, direction signals, etc., there is no recognized or established signal, either manual, mechanical or electrical, whereby the driver of a vehicle may signal to drivers to his rear that he intends to park. Since most parking occurs in areas of relatively high traffic density, such as shopping areas or other business areas, it is desirable to provide signaling means on automobiles whereby the driver may give advance warning to cars in his rear that he intends to park. This is particularly true in situations where the driver desires to park in a parking space parallel to the curb between two cars which are already parked. In this situation, the usual method of maneuvering into the parking space is to pull ahead of the parking space parallel to the car already parked in front of the open parking space and then back into the parking space. Since the driver of a car immediately following the car which is planning to park has no advance warning that the lead car is going to pull ahead of the parking space and then back into it, the following car frequently pulls up so close behind the lead car as to prevent it from backing into the parking space, with the result that the following car must frequently back up in a traffic lane or must pull out abruptly into a passing lane. Both of these situations are conducive to traffic tie-ups and collisions. If the driver of the car which desires to park could give advance notice to the car immediately behind him that he intends to park then the second car can stop behind the open parking space so that the first car can be parked promptly, thus reducing traffic tie-up and preventing abrupt pull-outs, etc., which can be conducive to an accident. Even where a car which is going to park can pull directly into a parking space parallel to the curb without having to back up, it is desirable for the driver of the parking vehicle to give advance warning of his intention to the following car so that it can smoothly pull-out into a passing lane without blocking traffic.

It is, therefore, an object of the present invention to provide a signaling device installed at the rear of an automobile having suitable parking indicia, such as cut-open letters of the word "PARKING," which can be illuminated by the driver of the car operating a switch so as to turn on lamps which illuminate the signal whereby his intention will be indicated to any following car. Other and further objects will be apparent as the description progresses.

In brief, the device of the present invention comprises a frame adapted to be affixed in a suitable opening in a sub-stantially vertical, unobstructed rear surface of an automobile so as to provide a window therein. Held in the frame, and covering the window, is a sheet of translucent colored material, such as a translucent plastic or glass sheet. Masking means are provided against the inner surface of this transparent sheet which are opaque in a portion of their area but have cut-out or otherwise translucent or transparent portions for suitable parking indicia, such as the word "PARKING," thereon. A light compartment is formed inwardly of said masking means by a reflector set in said frame and having lamps for illuminating the parking indicia. The electrical circuit to these lamps is controlled by an "on-off" switch, mounted on the steering column or other location convenient to the driver of the vehicle, so that the driver of the vehicle as he approaches a parking space he intends to use can turn the lamps on and thus advise the drivers to his rear of his intention to park. It is obvious that when the lamps are turned on, the parking indicia will be illuminated and visible through the outer colored translucent sheet, but, when the lamps are not illuminated, the parking indicia will not be visible through the cut-out or otherwise transparent or translucent portions of the masking means.

Reference now should be made to the accompanying drawings in which:

FIG. 1 is a perspective view of the rear of an automobile having the signaling device of the present invention installed therein;

FIG. 2 is a perspective assembly view, with the parts separated, of the signaling device of the present invention; and FIG. 3 is a cross-sectional view, taken on the line 3—3 of FIG. 2 of the signaling device of the present invention and a plan view of the electrical circuit for operating the same.

As illustrated in FIG. 1, the device of the present invention is installed in a suitable substantially vertical unobstructed surface at the rear of the automobile, such as panel 1 above the upper license plate but below the lid for the trunk, by inserting the frame 2 in a suitable opening in panel 1.

The frame 2 may be in the form of a Z-bar with its outer flange 3 affixed to panel 1 by spot welding or other fastening means, such as riveting or bolting. A sheet of translucent, preferably colored, material, such as a colored plastic or glass sheet 4 is held in the frame 2 against the inner flange 5 thereof. Masking means 6, which may be an opaque sheet or film having cut-out or otherwise translucent or transparent portions for suitable parking indicia (e.g., a stencil having the cut-out word "PARKING" thereon) is mounted against the inner surface of translucent colored sheet 4. A reflector 7 is mounted against the masking means, and the entire unit held together in frame 2 by suitable means, such as nuts 9 on stud bolts 8 extending inwardly from the flange 5. One or more lamp sockets 10 having lamps 11 therein are mounted in the reflector 7.

The lamps are connected to a suitable power source, such as battery 12, through conductors 13 and 14. A switch 15 is connected in series in conductor 14 and is controlled by an "on-off" button 16 which may be mounted on the steering column or other location convenient to the driver of the automobile, such as the dash. Although not essential, it is preferred to include a flasher unit, indicated as 27, in series in conductor 14 and also suitable visible indicating means, such as lamp 17 and possibly also audible indicating means, such as a buzzer, indicated as 18, in series in conductor 14 so as to indicate to the driver when the switch 15 is closed and thus remind him to turn the unit off when he has completed his parking maneuver.

If desired, suitable automatic means may be provided for turning the unit off on performance of some operation, which is normally performed on completion of a parking maneuver. As illustrated in FIG. 3, such means may comprise a second switch 19 controlled by button 16 so that it will be closed when switch 15 is closed. Switch 19, when closed, completes the circuit from conductor 13 through conductor 20 to a solenoid indicated as 21, and line 22 to switch 23, controlled by the ignition switch 24, through line 25 to battery 12. Spring 26 may be provided to normally urge the push button 16 in a direction to open switches 19 and 15. However, when the switch 19 is closed, the solenoid 21 holds switch 19 and switch 15 in closed position so that once the driver depresses the button 15 to close switch 15 and thus also switch 19, the lamps 11 are illuminated and the parking indicia are visible through translucent colored sheet 4 until the parking maneuver has been completed and the ignition turned off to thus open switch 23, de-energize solenoid 21 and permit spring 26 to open switches 15 and 19.

It will be apparent, of course, that in place of controlling the switch 23, to open the circuit to the solenoid 21, by operation of the ignition switch mechanism 24, it may be controlled by the operation of some other element in the vehicle which is normally operated on completion of a parking maneuver. For example, it may be controlled by operation of the manual emergency or parking brake or, in the case of automobiles having automatic transmissions, by a switch operated when the transmission lever is moved into "parking" position. If desired, the switch 15 may be in the form of a toggle switch with suitable mechanical connections therefrom to, say, the transmission lever or the parking brake to open the switch when the transmission lever is moved into "parking" position or the parking brake is set.

It is believed that the operation of the device of the present invention will be apparent from the foregoing description thereof, but, in brief, the operation is as follows:

When the driver of the automobile desires to advise drivers of cars to his rear that he intends to park, he depresses the button 16 thus closing switch 15 and closing the circuit to lamps 11 thereby causing them to be lighted and shine through the translucent or transparent parking indicia on opaque masking means 6 so that the parking indicia is visible on translucent colored sheet 4. The translucent sheet 4 may be red in color but preferably is orange or yellow so as to distinguish it from other signals, such as stop lights, direction signals, etc., on the vehicle. The flasher unit 27 causes the lamps 11 to flash on and off so as to attract attention to the parking indicia which now is illuminated on sheet 4. When the driver of the car has completed his parking maneuver, he will be reminded that the signal is on and flashing by indicator lamp 17 which should be placed at a convenient location in the line of his vision and/or by buzzer 18 so that he should pull out button 16 and thus open switch 15 to turn the sign off. However, if as illustrated in FIG. 3, means such as solenoid 21, are provided to hold switch 15 closed then, if the driver fails to open switch 15 when the parking maneuver has been completed, as soon as the driver turns off his ignition, he will open switch 23 and thereby de-energize the solenoid 21, thus permitting spring 26 to raise button 16 and thus open the switch 15 and also switch 19, thereby turning the signal off.

It will be apparent that since, in its preferred embodiment the translucent sheet 4 is colored, the cut-out or otherwise translucent or transparent portions of masking sheet 6 will not be visible from the rear of the vehicle, i.e., the word "PARKING" will not be seen, when the lamps 11 are unlit, but it is extremely visible when these lights are lit so that the word "PARKING" appears as an illuminated sign or a signal on the translucent sheet 4.

Various modifications and alternative constructions will suggest themselves to those skilled in the art, which do not depart from the spirit of the present invention, or the appended claims.

What is claimed is:

1. A safety parking signal device for automotive vehicles comprising a lamp compartment mounted at the rear of an automotive vehicle, said lamp compartment comprising a rear window having translucent parking indicia therein, reflector means disposed inwardly of said window and lamps mounted in said reflector means to illuminate said parking indicia, a circuit for such lamps including a source of current supply, a manually operated "on-off" switch in said circuit located conveniently to the operator of said automobile and having a manual operating member to move it to both "on" and "off" positions whereby when said manually operated "on-off" switch is manually moved to "on" position the lamps are energized to thereby cause said translucent parking indicia to become visible on said window and when said "on-off" switch is manually moved to "off" position, said lamps are de-energized to cause said translucent parking indicia to become invisible on said window at any time before, during or after a parking maneuver and means connected in series in said circuit to said lamps for intermittently interrupting the current flowing therein to thereby cause said lamps to flash, means normally tending to move said "on-off" switch to "off" position, and a separate holding circuit having means therein for holding said "on-off" switch in "on" position, a switch in said holding circuit mounted on and operated by operation of said "on-off" switch to "on" position to energize said holding circuit and thereby activate said means to hold said "on-off" switch in "on" position and a second switch in said holding circuit and means operable by an element in said automotive vehicle normally operated on completion of a parking maneuver to open said second switch in said holding circuit to thereby cause said " on-off" switch in said circuit to said lamps to be moved to "off" position.

2. A device as defined in claim 1 wherein means are included in said circuit to said lamps to indicate to the driver of said automotive vehicle when the circuit to said lamps is closed.

3. A device as defined in claim 1 wherein said means for holding said "on-off" switch in "on" position comprises a solenoid actuated means adapted to hold said switch in "on" position when activated.

4. A device as defined in claim 3 wherein said means for opening said second switch in said holding circuit are operated by the ignition switching mechanism of said automotive vehicle when the ignition switching mechanism is turned to "off" position.

* * * * *